Aug. 23, 1966     E. S. LEWIS ETAL     3,268,894
POLARIMETER

Filed March 9, 1964     2 Sheets-Sheet 1

Edwin S. Lewis
Donald C. Venters
Robert M. Smith,
            *INVENTORS.*

POLARIMETER

Edwin S. Lewis, Cherry Hill, N.J., Donald C. Venters, Overland, Mo., and Robert M. Smith, Moorestown, N.J., assignors, by mesne assignments, to the United States of America as represented by the Secretary of the Army
Filed Mar. 9, 1964, Ser. No. 350,627
5 Claims. (Cl. 343—100)

This invention relates to a system whereby the plane of polarization of a received RF signal may be determined. The invention further relates to a device which will determine the frequency of said RF signal.

In radar systems for detecting missiles there is a need to know the plane of a polarized signal either emitted or reflected from a missile. This information is needed to help determine whether an object is a warhead or a dummy. A device for detecting the plane of a polarized signal and also the frequency of that signal is useful in GCA landing systems of aircraft.

It is an object, therefore, of this invention to provide a polarimeter suitable for use in missile detecting systems and GCA landing systems.

Another object of this invention is to provide a detector which will detect the plane of a polarized signal.

A further object of the present invention is to provide a polarimeter which will detect the frequency of a polarized signal wave.

These and other objects and advantages of the present invention will become apparent from the following detailed description and from the accompanying drawings, in which.

Figure 1:
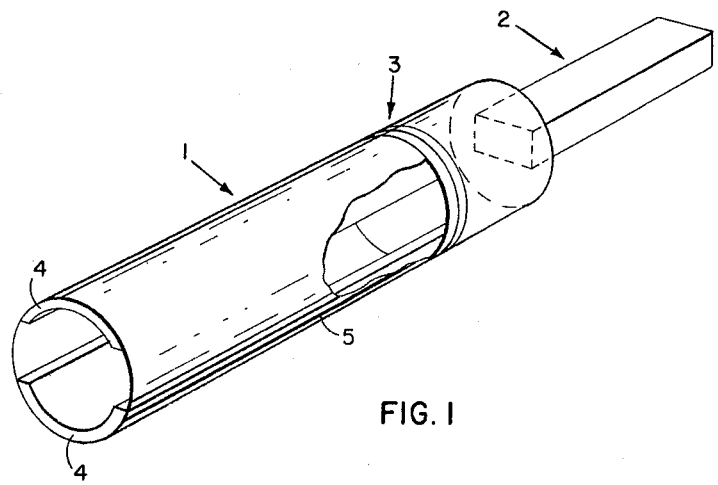
FIGURE 1 illustrates a perspective view, partially cut away, of a preferred form of the present invention.

The invention may be better understood with reference to the drawings in which reference number 1 of FIGURE 1 represents a rotating section of a waveguide which has one end coupled to a linear, polarized pickup device 2 by means of a rotary joint 3. The cross section 4 of the rotating guide is in the form of a cylinder cut axially by parallel planes. An elliptical cross section could also be used. The other end of rotating guide 1 is coupled to an antenna feed, not shown. Linear polarized pickup 2 is orientated to detect the vertical components applied to its input. A sleeve 5 is provided to house the rotating guide. A driving means 7, not shown in FIGURE 1, is provided to rotate the rotating guide section.

The signal output of the pickup is such that either the plane of polarization or the frequency of a received signal may be determined. A polarized wave entering the rotating section of the waveguide will be resolved into two components and will be caused to rotate in synchronization with the waveguide. The linear detector 2 being orientated to detect the vertical component will have an amplitude modulated output signal which shifts in phase with a change in the plane of polarization or in amplitude with a change in the frequency of the received signal.

Figure 3:
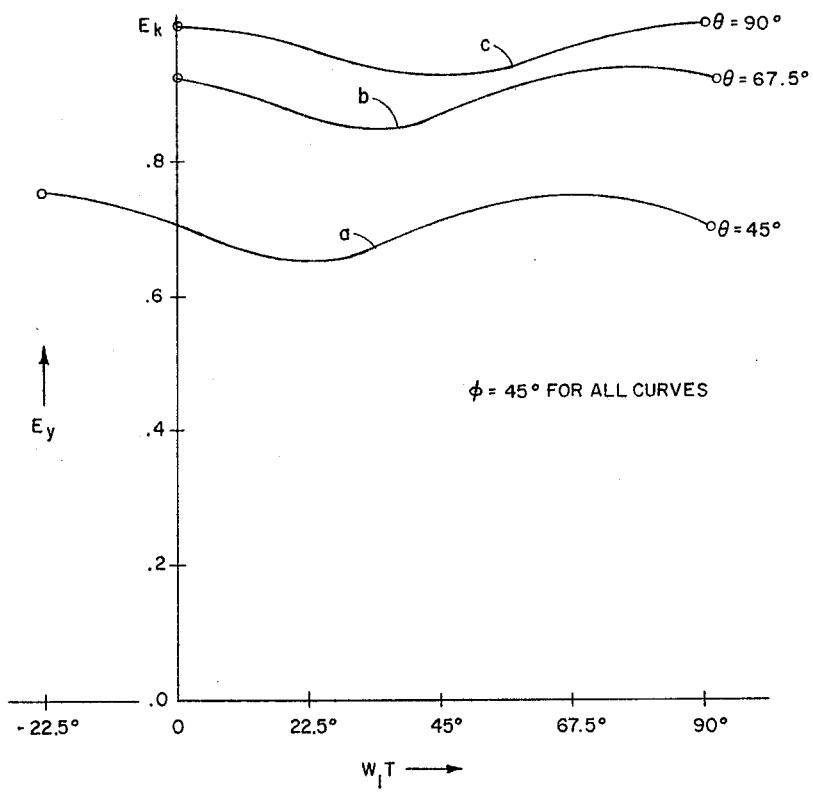
FIGURE 3 illustrates waveforms derived from the output of the audio amplifier of FIGURE 2.

The shift in the phase of the pickup with a shift in the plane of polarization of the input signal is illustrated in FIGURE 3. The abcissa is the angle due to rotation of the waveguide ($W_1 t$) and the ordinate is the vertical component of the signal ($E_y$). The phase shift between orthogonal components within the rotating guide is held at 45° for all the curves. Curve "a" represents the waveform when the angle between the horizontal and the plane of polarization of the received signal ($\theta$) is 45°; curve "b" represents the waveform when $\theta$ is 67.5°, and curve "c" represents the waveform when $\theta$ is 90°.

The polarimeter can be built into the guidance beacon transmitter to provide information on the roll position of a missile as the polarimeter will detect the plane of polarization of the missile's beacon signal. The polarimeter could also provide information of the flight attitude of aircraft in ground controlled approach systems. The polarimeter could further be used in identification of aircraft by determining the frequency of its beacon signal.

Figure 2:
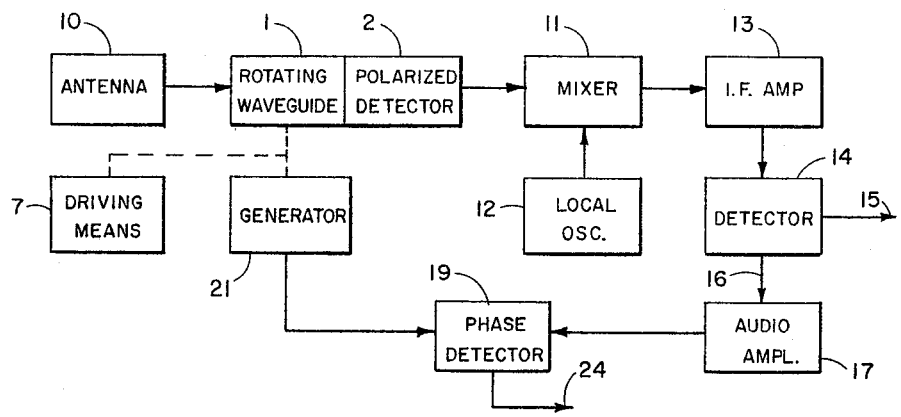
FIGURE 2 illustrates a system, in block diagram, according to the invention.

In the block diagram of FIGURE 2 an antenna 10 feeds a polarized signal into a rotating waveguide 1 and into a polarized detector 2. The output of the polarized detector is fed to a mixer 11 which mixes the signal with an output from a local oscillator 12. The output of the mixer is connected to an I. F. amplifier 13 which amplifies the signal and feeds it to a detector 14. Detector 14 has a first output 15 which has an amplitude proportional to the frequency of he input signal. Detector 14 further has an output 16 which is amplified by an audio amplifier 17 and fed to one input of phase detector 19. The other input of phase detector 19 is fed by an output of generator 21. Generator 21 is driven by a driving means 7 which also drives the rotating waveguide. Driving means 7 is a constant speed motor so that the rotating waveguide and the generator will be driven at a constant (and related) speed. Generator 21 will, therefore have a constant frequency output. The local oscillator is set so that the output of mixer 11 will have this same frequency. Output 24 of the phase detector will be proportional the plane of polarization of the oncoming signal.

A mathematical analysis for the general solution for the variation of the output signal of the pickup is:

$$E_y = E_{max}\left[\left(\frac{\cos\theta\,\sin 2W_1 t}{2} + \sin\theta\,\sin W_1 t\right)\cos Wt \right.$$
$$\left. + \left(\sin\theta\,\cos W_1 t - \frac{\cos\theta}{2}\sin 2W_1 t\right)\cos(Wt+\phi)\right]$$

The explanation of terms used is as follows:

$E_y$—vertical component of signal;
$\theta$—angle between the horizontal and the plane of polarization of the received signal;
$W_1 t$—angle due to rotation of the waveguide;
$Wt$—angle due to the RF variation of the received signal; and
$\phi$—phase shift between orthogonal components within the rotating guide.

For the case of $\phi=45°$, the expression $E_y$ takes the form of $$E_y = E_m(A\cos Wt - B\sin Wt)$$

where:

$A = .293\cos\theta\,\sin 2W_1 t + 1.707\sin\theta - .293\sin\theta\,\cos 2W_1 t$ $B = .707\sin\theta + .707\sin\theta\,\cos 2W_1 t - .707\cos\theta\,\sin 2W_1 t$ While the invention has been described with reference to a preferred embodiment thereof, it will be apparent that various modification and other embodiments thereof will occur to those skilled in the art within the scope of the invention. Accordingly, we desire the scope of our invention to be limited only by the appended claims.

We claim:

1. A polarimeter comprising in combination a rotating joint having a rotating end and a stationary end, a rotating wave guide connected to the rotating end of said joint, means to rotate said wave guide, a polarized pickup connected to said stationary end of said joint, and wherein said wave guide is in the form of a cylinder cut axially by parallel planes whereby a polarized signal entering said wave guide will be divided into two components and rotated in synchronization with the wave guide.

2. A polarimeter as set forth in claim 1 further comprising a first detector means connected to an output of said pickup for detecting the frequency, phase and amplitude of the signal received by said pickup; generating means connected to said means to rotate the wave guide whereby said generator will have an output voltage which can be used as a reference; and a phase detector connected to compare the diffeernce in the phases of said first detector and said generator whereby the plane of polarization of the signal may be determined.

3. A polarimeter as set forth in claim 2 further comprising an antenna connected to said wave guide to supply said signal.

4. A polarimeter as set forth in claim 1 further comprising a detector means connected to an output of said pickup for detecting the amplitude of the signal received by said pickup whereby the frequency of said signal may be determined.

5. A polarimeter as set forth in claim 4 further comprising an antenna connected to said wave guide to supply said signal.

References Cited by the Examiner
UNITED STATES PATENTS 2,863,144  12/1958  Herscovisi et al. _____ 343—756
3,171,125  2/1965   Butler _____ 343—100.3

CHESTER L. JUSTUS, *Primary Examiner.*

T. H. TUBBESING, *Assistant Examiner.*